United States Patent [19]

Smith

[11] Patent Number: 5,407,630
[45] Date of Patent: Apr. 18, 1995

[54] LINING OF PIPELINES OR PASSAGEWAYS

[75] Inventor: Edward P. Smith, Ravensthorpe, Great Britain

[73] Assignee: Insituform (Netherlands) BV, Rotterdam, Netherlands

[21] Appl. No.: 49,328

[22] Filed: Apr. 21, 1993

Related U.S. Application Data

[63] Continuation of Ser. No. 762,004, Sep. 19, 1991, abandoned.

[30] Foreign Application Priority Data

Mar. 21, 1989 [GB] United Kingdom ................. 8906467
Oct. 27, 1989 [GB] United Kingdom ................. 8924243
Oct. 27, 1989 [GB] United Kingdom ................. 8924244
Jan. 3, 1990 [GB] United Kingdom ................. 9000058

[51] Int. Cl.⁶ ............................................. B29C 63/36
[52] U.S. Cl. ................................... 264/516; 156/287; 156/294; 264/36; 264/269
[58] Field of Search ........................ 264/36, 516, 269; 156/287, 294; 138/97, 98

[56] References Cited

U.S. PATENT DOCUMENTS 4,064,211 12/1977 Wood .
4,581,085 4/1986 Wood .
4,714,075 12/1987 Muller .
4,770,562 9/1988 Muller .
4,786,345 11/1988 Wood .
5,034,180 7/1991 Steketee .
5,044,405 9/1991 Driver .

FOREIGN PATENT DOCUMENTS

275060 7/1988 European Pat. Off. .

Primary Examiner—Mathieu D. Vargot
Attorney, Agent, or Firm—Lowe, Price, LeBlanc & Becker

[57] ABSTRACT

A method for lining a passageway which includes providing a plurality of tube sections connected end to end, pulling a first tube section through the passageway in a collapsed condition and thereafter everting a second tube section into the interior of said collapsed first tube section to cause it to expand outwardly toward the interior walls of said passageway.

10 Claims, 7 Drawing Sheets

LINING OF PIPELINES OR PASSAGEWAYS

This is a continuation of application Ser. No. 07/762,004, filed Sep. 19, 1991, now abandoned, and the benefits of 35 USC 120 are claimed relative to it.

BACKGROUND OF THE INVENTION

This invention relates to the lining of pipelines or passageways by a process which has become known as "soft lining".

A soft lining process involves utilising a flexible tube which is sized to the diameter and length of the pipeline or passageway to be lined. The tube is coated or impregnated with a curable synthetic resin which cures after the lining tube has been placed in position lining the surface of the pipeline or passageway in order either to form an adhesive which anchors the lining tube to the pipeline or passageway surface or to form in effect a moulded body defining a rigid pipe which is free standing inside the pipeline or passageway. The lining tube is inserted in the pipeline or passageway whilst the resin is still soft, and is shaped to the passageway surface by fluid pressure, and whilst it is held in this condition the resin is cured usually by the application of heat or more recently by the application of light radiation supplied for example by ultraviolet lights. In the latter case, the resin system chosen has to be activatable by the radiation.

The most widely practised method of soft lining is disclosed in British Patent No. 1449455 and in such method the lining tube is everted into the pipeline or passageway from one end thereof, the lining tube being provided on its outer side with an impermeable coating or film, which after eversion becomes the inner surface of the pipeline providing a smooth flow enhancing surface to the interior of the re-lined pipeline or passageway.

SUMMARY OF THE INVENTION

In accordance with the present invention there is provided a soft lining method wherein a lining tube is constructed in two sections each at least approximately equal to the length of the pipeline or passageway to be lined, the sections being connected end to end, and the insertion process comprises either pulling in of one of the sections followed by eversion of the other section into the first mentioned section, or eversion of one section which causes pulling in of the other section.

In the preferred embodiment, the lining tube is in fact made up of three sections each of a length equal to the length of the section of the pipeline or passageway to be lined or greater than such length, said three sections comprising a first section referred to herein as a preliner tube, a second section being a lining tube and comprising a tube of a material which is or is adapted to be impregnated or coated with curable synthetic resin, and a third section referred to herein as the inflation tube, the purpose of which is to inflate the lining tube when it is in position by eversion of the inflation tube into the lining tube.

The inflation tube may also be of or include a material which is coated or impregnated with curable synthetic resin, but as it is everted, it will preferably in such case have an outer membrane for containing the resin. For example, the inflation tube may typically be constructed and impregnated as described in British Patent No. 1449455.

In the instant invention, the lining method can comprise only the utilisation of the preliner tube and the lining tube, the prelining tube typically comprising a strong fabric coated tube of sufficient tensile strength and flexibility, which may be everted into the pipeline or passageway by conventional everting techniques using a liquid typically water as the eversion medium. As the prelining tube is being inserted, the lining tube which is connected to the tail end of the prelining tube is pulled into the pipeline or passageway and it will be buoyantly supported in the everting water as it is so being pulled in. When in reaches the desired position, it may be inflated by any suitable means, for example by a separate inflation tube. The lining tube in this embodiment may be sealed at both ends after being filled with resin to impregnate resin absorbent layers of the tube, and also after removal of the air from inside the tube. The removal of air and the sealing of ends is particularly advantageous insofar as if there are bubbles of air in the resin, these tend to cause imperfections in the finished, cured lining which can lead to permeation and mechanical difficulties.

When the lining tube is in position, the trailing end must be opened to allow insertion of the inflating medium and/or inflation tube but the ingress of air into the impregnated lining tube can easily be avoided.

The second inventive aspect comprises the utilisation of the lining tube to the trailing end of which is connected the inflation tube. The leading end of the lining tube and the trailing end of the inflation tube may be sealed, and where the two tubes are connected they may also be sealed to each other to make a continuous tube. This ensures that all air can be excluded from the inside of the assembly comprising the two tubes so that resin contained therein will thoroughly impregnate the absorbent layers of the lining tube and/or of the inflation tube. The inflation tube and lining tube may be interconnected by a section referred to as the connection tube permitting the inflation tube to be everted at the appropriate stage of the insertion. To this end the connection tube may be provided with a tuck or fold so that it is folded in upon itself which will facilitate the operation of the inversion process, as will be explained in more particular detail with reference to the embodiment of the invention which is described hereinafter.

Obviously the best results flow from the combined effects of the two inventive aspects i.e. when the assembly comprises first, second and third tubes and the lining sequence comprises everting the prelining tube into the pipeline or passageway for the placement of the lining tube in the pipeline or passageway followed by the eversion of the inflation tube into the lining tube to inflate same onto the prelining tube and supported against the passageway surface and held in such condition until the resin of the lining tube and/or the inflation tube is cured.

The utilisation of a prelining tube has the desired advantage that the prelining tube prevents the ingress of resin into lateral connections which meet the pipeline or passageway being lined.

THE DRAWINGS

One embodiment of the invention will now be described, by way of example, with reference to the accompanying diagrammatic drawings, wherein.

PREFERRED EMBODIMENT

Referring to the drawings, a flexible tubular liner assembly is illustrated by reference 10 in FIG. 1. The assembly is shown as being made up of three sections namely a first section or preliner tube 12, a second section or lining tube 14 and a third section or inflation tube 16, these being connected end to end for example at joint regions 18 and 20. Each of the sections 12, 14 and 16 as shown is of a length at least equal to a length L, which is the length of the pipeline or passageway to be lined by the assembly.

The joint 18 is formed in that the sealed end of lining tube 14 is tied to the sealed trailing end of preliner tube 12, but the junction between lining tube 14 and inflation tube 16 indicated by reference 20 is constituted by a connection section 22 which is referred to herein for convenience as an inversion tube, whose function will be explained in more detail hereinafter.

Figures 1, 1A:
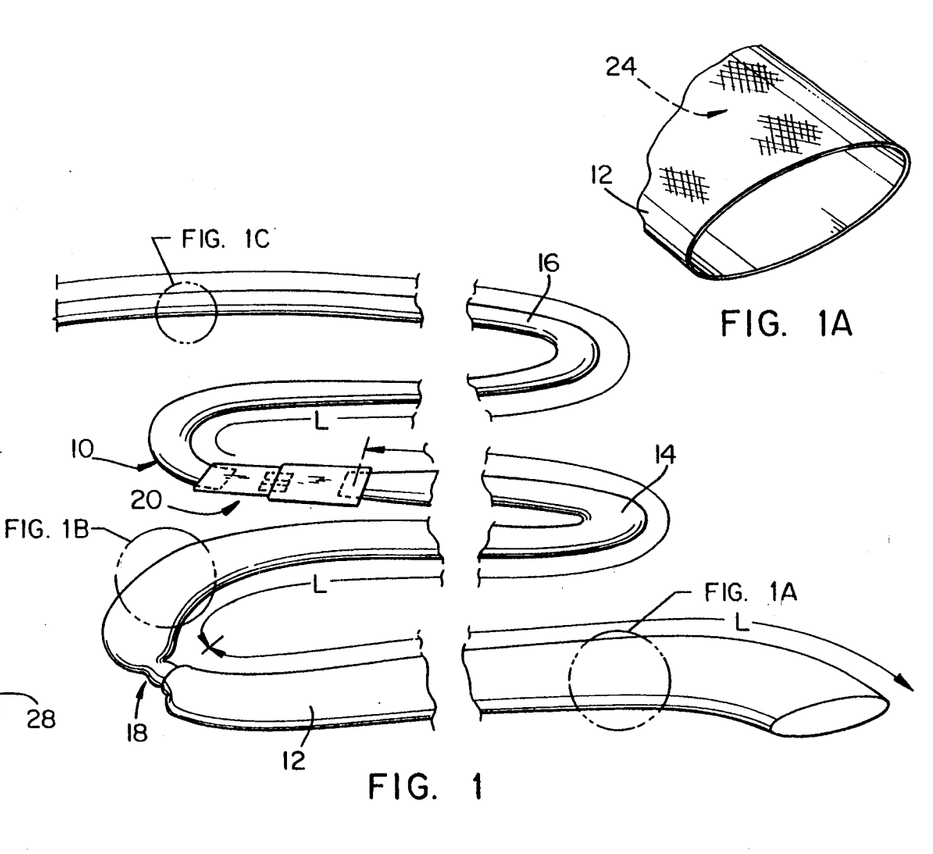
FIG. 1 is a perspective view of a tubular assembly for insertion into a pipeline or passageway in accordance with one embodiment of the present invention.
FIGS. 1A, 1B and 1C respectively show in enlarged detail the respective sections of the tube assembly shown in FIG. 1, and in cross section.

As shown in FIG. 1A the prelining tube 12 is a single layer tube which may be made up of a woven fabric 24 which is covered with plastic or rubberised coating so as to give the tube 12 the required strength. The requirements of the tube 12 are that is should be of sufficient strength to perform its function and also should be impermeable to a fluid, especially water, which is used to evert this tube 12 into the pipeline or passageway to be lined.

Figure 1B:
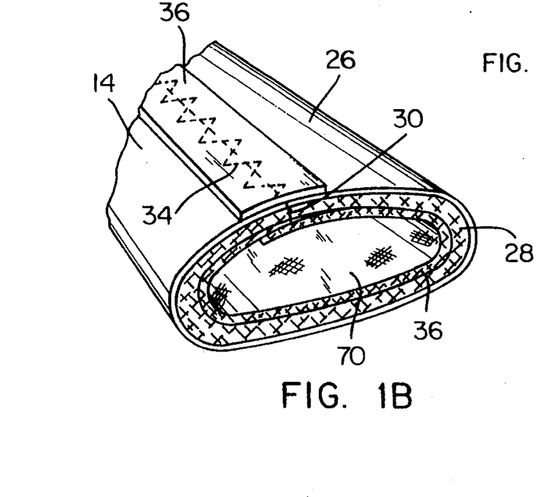

The tube 14 on the other hand as shown in FIG. 1B comprises an outer coating 26 of an impermeable film material such as polyurethane or a laminated material. The coating 26 is bonded to a relatively thick felt layer 28, and in order to form the tubular structure as shown in FIG. 1B, this material is coiled into tubular form and abutting seam 30 has stitching 34 bridging same in order to connect the butting ends. The stitching is covered by a sealing strip 36.

Inside the layer 28 is a further felt layer 36 which is formed into a tube so that the edges overlap, and through the overlapped edges there is stitching in order to form the tubular structure. As many layers 36 as are required may be embodied in the tube 14. The layers 28 and 36 are of a material i.e. needled felt which has an excellent resin absorbency characteristic insofar as it will soak up synthetic resin introduced into the interior of the tube 14 so that the layers 28 and 36 become impregnated with said resin.

The inflation tube 16 in the embodiment illustrated in similar to tube 14 insofar as it is provided with an outer membrane 40 which is bonded to an inner felt layer 42 and this material is coiled sewn and sealed in a similar fashion to material of the tube 14, but there is no additional thinner layer 36 and the felt layer 42 is thinner than the layers 28 and 36. The tube 16 furthermore is sized so as to be smaller than tube 14 because eventually it will fit inside this tube. The tube 16 can however be of a single layer material such as tube 12.

Figures 2, 3:
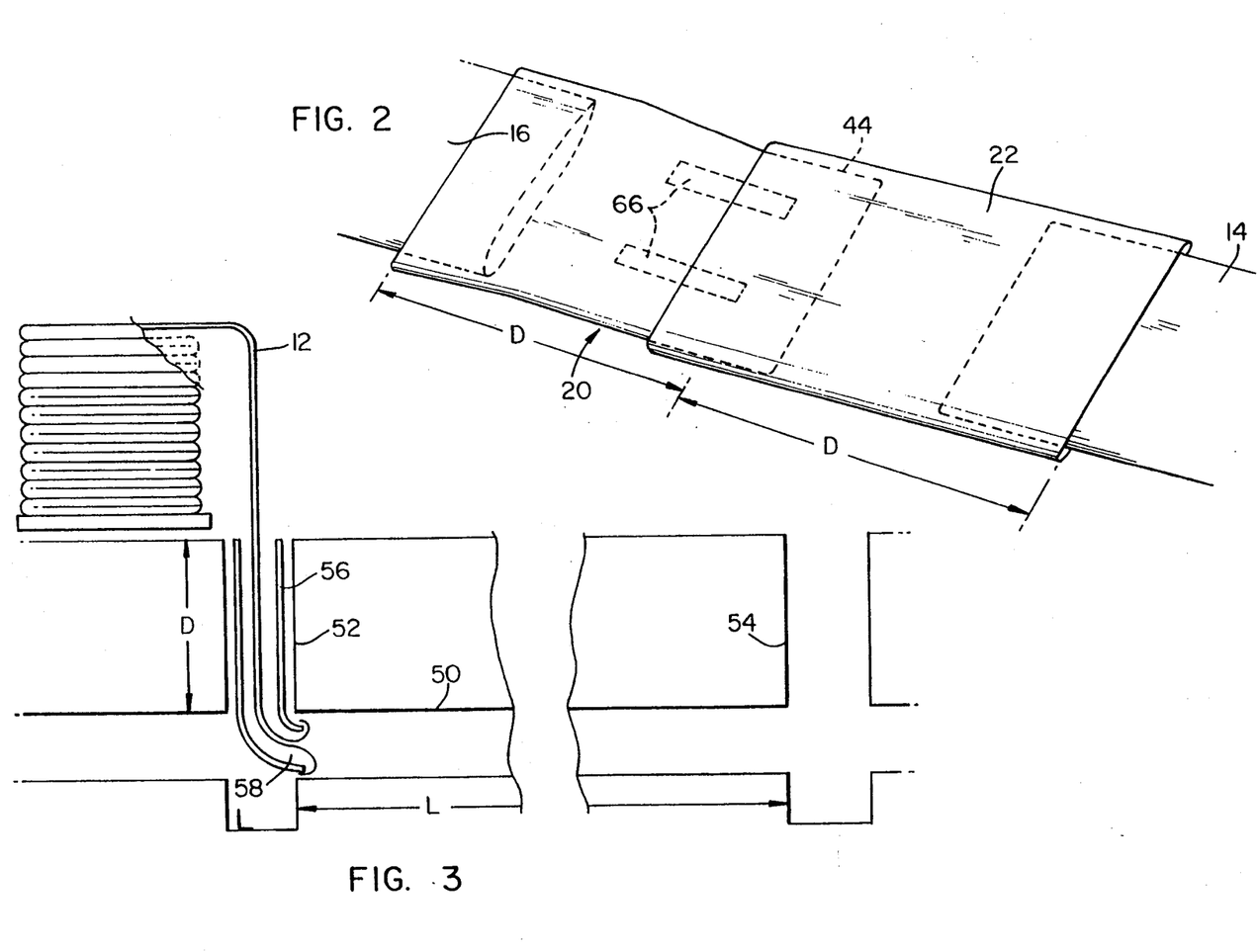
FIG. 2 shows a connecting section of the assembly shown in FIG. 1.
FIGS. 3–7 show respective stages in the installation of the tube assembly of FIG. 1 in an underground sewer.

The inversion tube 22 as shown in FIG. 2 is simply a length of tube similar to tube 12 (or it may be an extension of tube 16 or tube 14) connecting the ends of the tubes 14 and 16, but in addition tube 22 is formed with a central tuck 44 for a purpose to be explained. The length of the inversion tube 22 with the tuck 44 is to D for a purpose to be explained in relation to the installation procedure illustrated with reference to FIGS. 3–7.

In the embodiment described, the leading end of the tube 14 is sealed as is the trailing end of the tube 16, and the inversion tube 22 forms a seal between the trailing end of tube 14 and the leading end of tube 16, but prior to sealing the leading end of tube 14 and the trailing end of tube 16, a sufficient amount of synthetic resin is introduced into the tubes 14 and 16 in order to impregnate the felt layers 28, 36 and 42, and also to expel all air from inside the tubes. In fact therefore these tubes 14 and 16 will be in a flattened collapsed state, full of resin, but devoid of any air therein.

If reference is now made to FIGS. 3–7, an explanation is given as to how the tube assembly of FIG. 1 is inserted into an underground sewer in order to create a lining for same.

In FIG. 3, the sewer is indicated by reference 50 and in fact is a length of sewer extending between two manholes 52 and 54. The sewer length 50 may require restoration or rehabilitation because of deterioration as a result of usage and age, which is a common problem with sewers of developed areas throughout the world.

It is also to be mentioned that in order to effect the lining operation to be described appropriate equipment must be provided on site such as pumps, vehicles, scaffolding etc., but such equipment has been omitted from the drawings in the interests of simplicity and also because the equipment for performing the methods is now well known.

Figure 4:
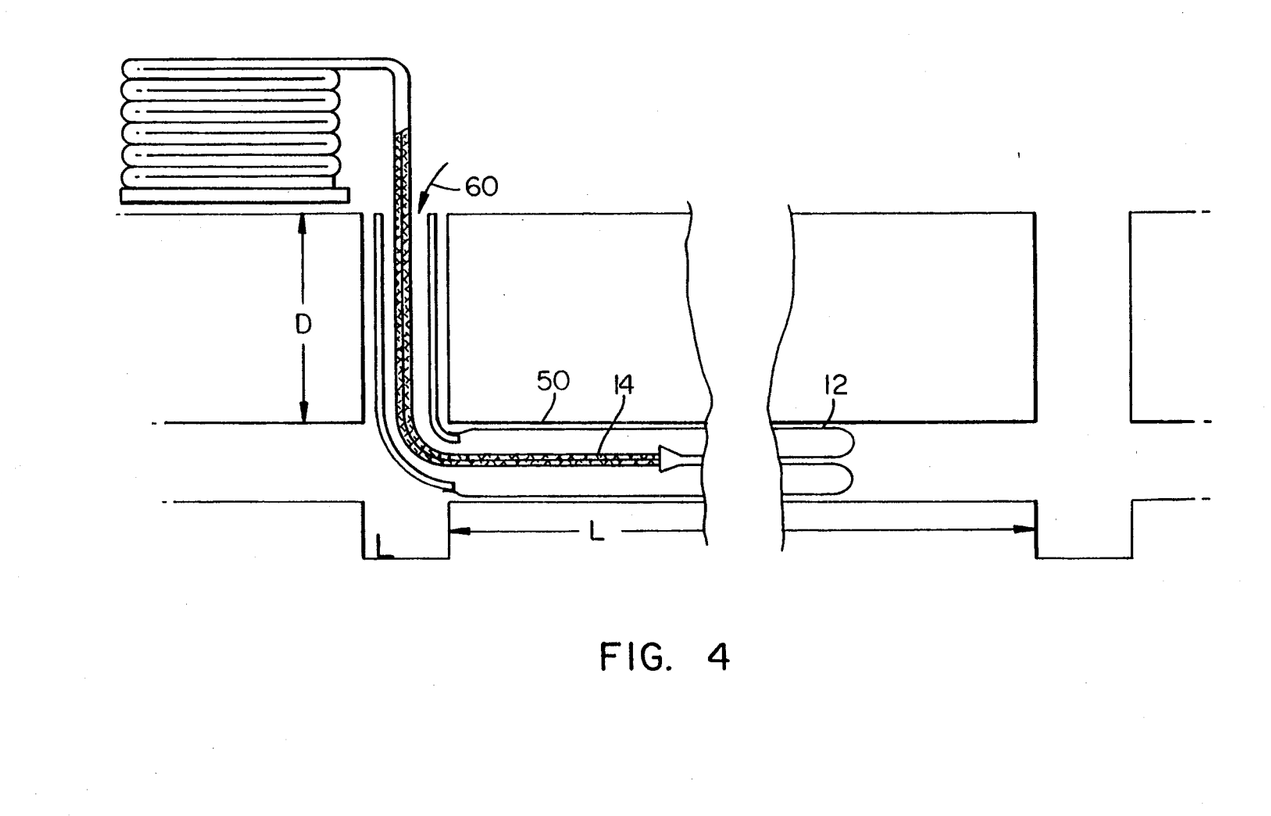
Figure 5:
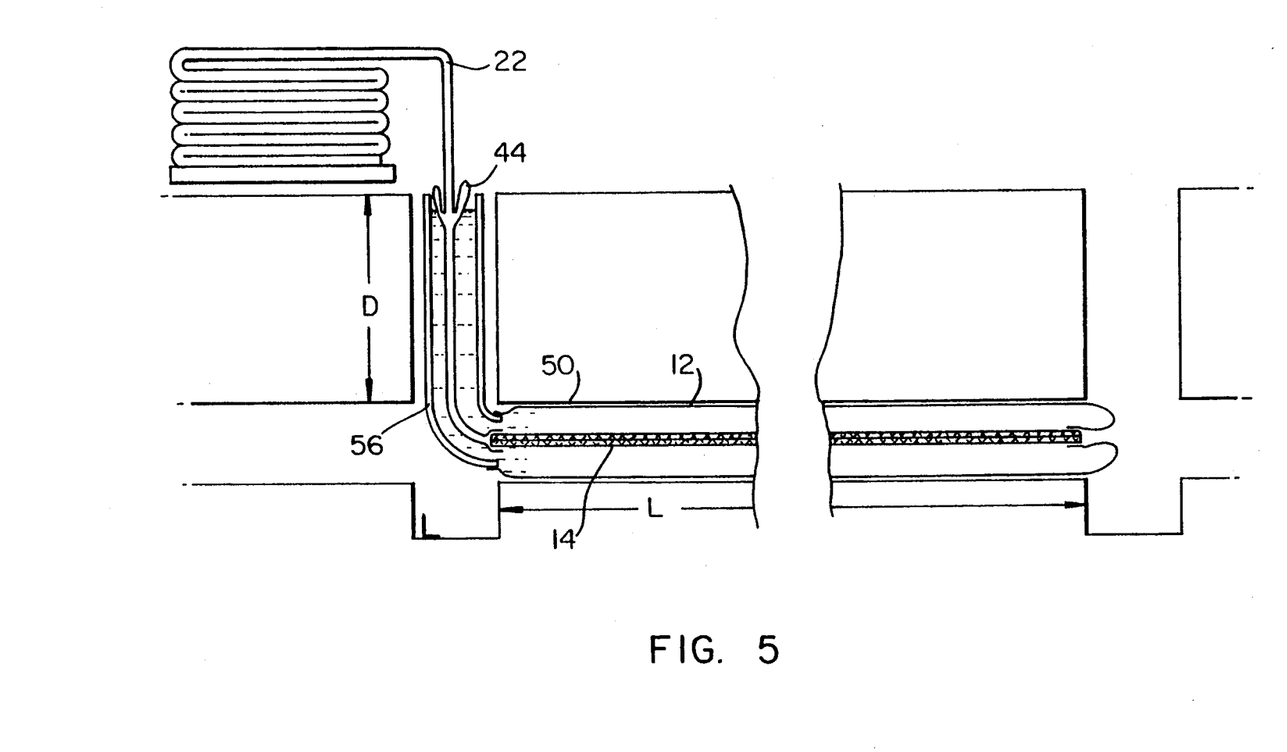

Into the manhole 52 is placed an elbow pipe 56 so that the open lower end of the elbow 58 faces the end of the sewer 50 to be lined. The leading end of the tube 12 is fed into the pipe 56, and is folded back as shown so as to be connected to the lower end of the elbow. Filling of the pipe 56 with water as indicated by arrow 60 in FIG. 4 causes the tube 12 to evert out of the end of the pipe 56 and into and along the sewer length 50 as shown clearly in FIG. 4. As the tube 12 everts so it pulls the next section of the tube assembly namely the lining tube 14 into and along the sewer length 50 as shown in FIG. 4. FIG. 5 shows the position when the prelining tube 12 has completed its eversion and the lining tube 14 is now in the correct position with its respective ends at the ends of the sewer section 50 to be lined. At this point the procedure is stopped, and it will be noticed that the inversion tube 22 is now located so that the leading half of same is in the pipe 56 and the tuck 44 is adjacent the top end of the pipe 56.

Figure 6:
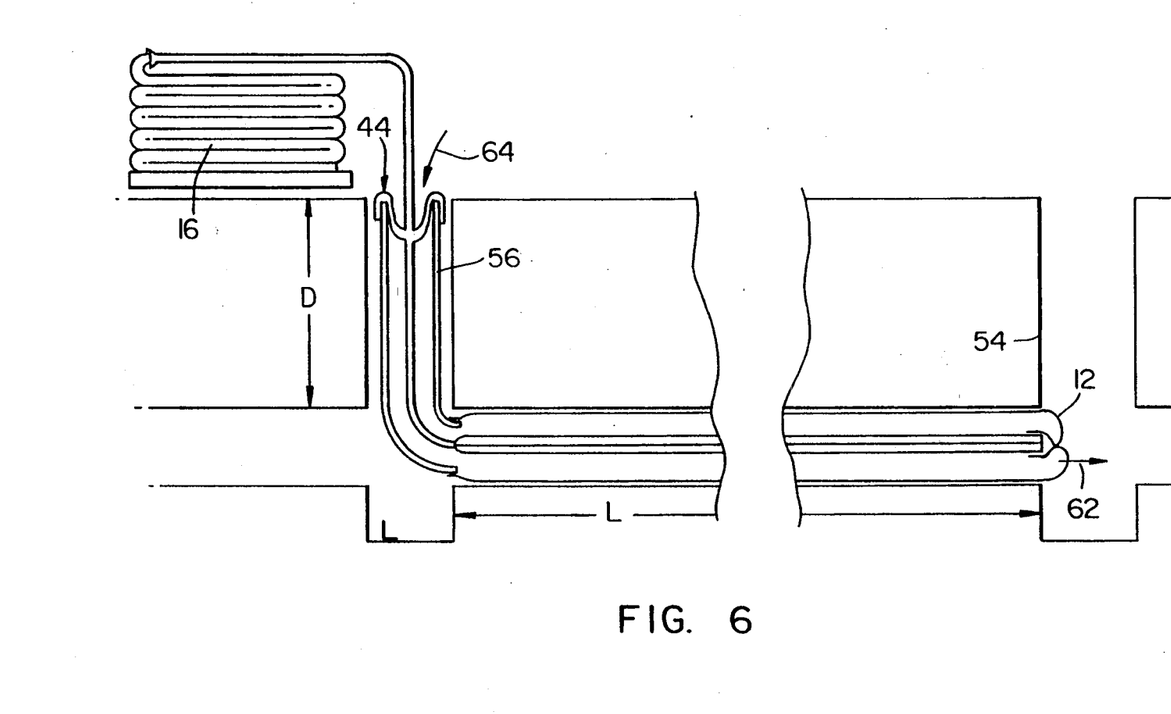

At this juncture, the end of the prelining tube 12 adjacent the manhole 54 is punctured in order to allow release of the water which was used for the initial inversion step, as indicated by arrow 62 in FIG. 6, and at the same time the tuck 44 in the inversion tube is folded over the top edge of the pipe 56 also as shown in FIG. 6 and is anchored thereto. The tuck can now be filled with eversion fluid e.g. water as indicated by arrow 64 in FIG. 6, which causes the second half of the inversion tube to evert into the first half and down the pipe 56, at the same time forcing the water from the puncture 62.

To thus fold the tuck over the top of pipe 56 it may be necessary to remove adhesive strips 66 as shown in FIG. 2 which are applied across the tuck so that same will be retained during the initial inversion step and other handling of the tubular assembly.

Figure 1C:
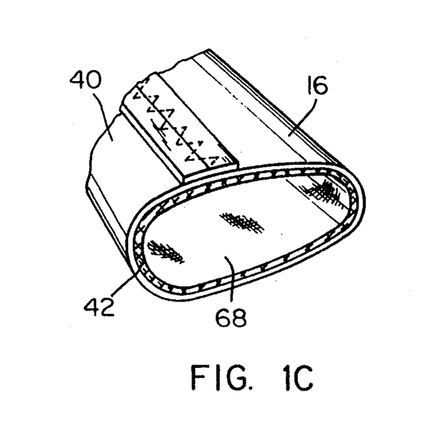
Figure 7:
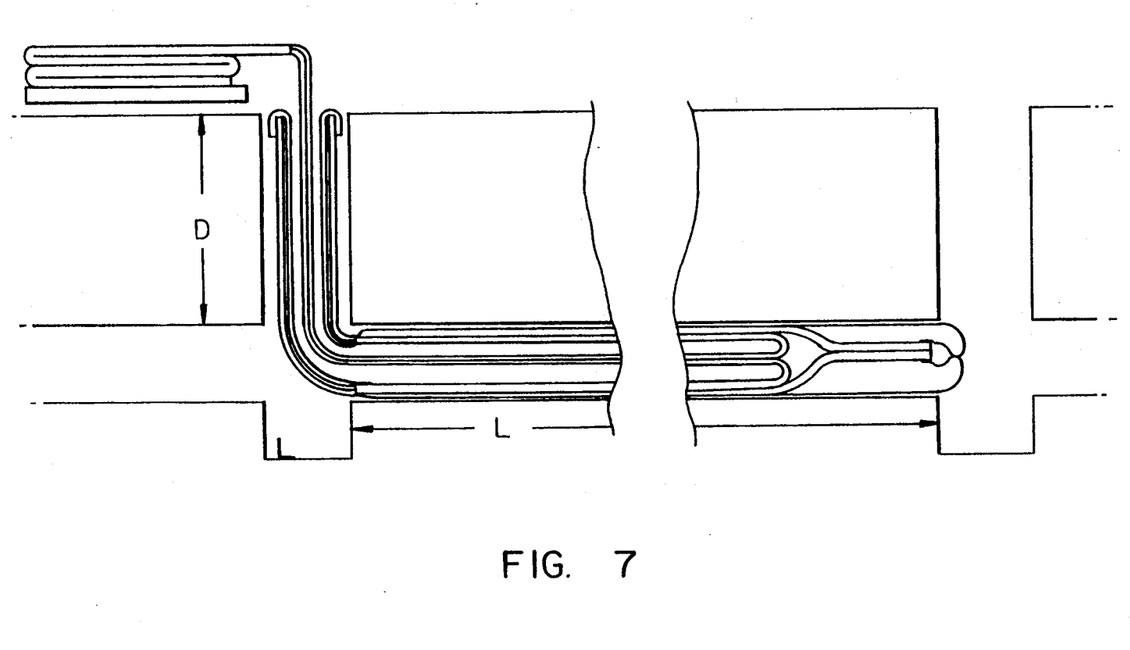

With the continued supply of water 64 to cause the second half of the inversion tube to evert into the pipe 56, so the last tube section 16 is pulled through pipe 56 and everts into the lining tube 14 and inflates same as indicated in FIG. 7. Therefore, the inner felt face 68 (FIG. 1C) of the lining tube 16 comes face to face with the inner felt face 70 of the tube 16.

Figure 8:
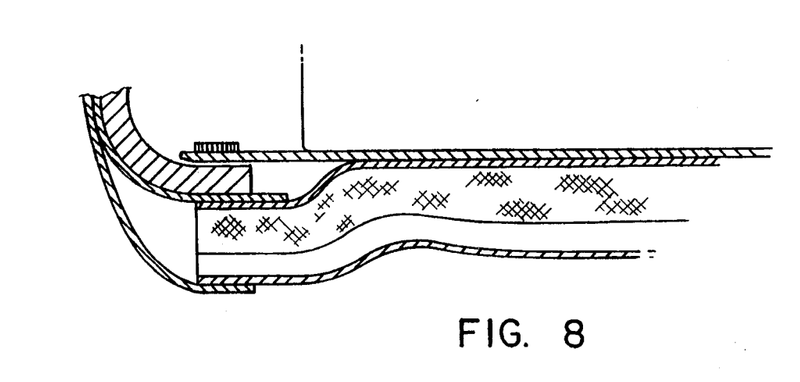
FIG. 8 shows in enlarged detail a section of the lining tube when in the sewer and lining same.
Figure 9:
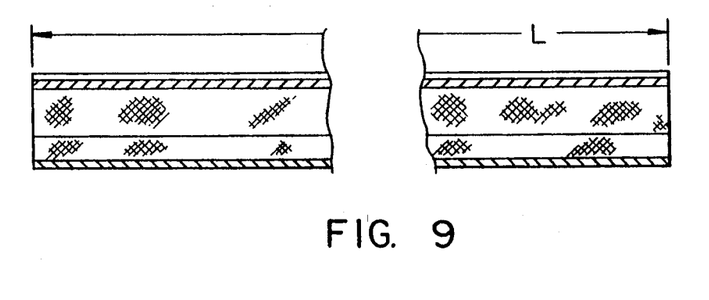
FIG. 9 is a sectional elevation to an enlarged scale illustrating one side of the installed lining.

As these felt layers are impregnated with uncured synthetic resin, so the felt layers of the respective tubes 14 and 16 in effect coalesce into a single integrated resin mass as shown in FIGS. 8 and 9.

The resin subsequently is cured by any suitable means such as by hot water or by light radiation, ultrasonics or other means and when the resin cures hard, a rigid pipe lining the sewer length 50 results.

Instead of using a preliner tube 12, the main tube 14 may be pulled directly into the passageway, especially when the passageway is smooth, using for example a rope.

Many advantages flow from the various aspects of the present invention which not only include the methods referred to herein, but also includes the tubular assembly.

These advantages include that by using a preliner tube and by pulling the liner tube into the passageway using the preliner tube and water, the liner tube can be supported by the water and will slip easily into position. Secondly, as the liner tube does not require to evert during any stage of the process, heavier liner tubes can be installed and they will easily pass round bends and corners.

The utilisation of an inflation tube which is integrally connected to the lining tube ensures accuracy of positioning and accuracy of inflation of the lining tube, and sealing of the ends of the tubes means that all air can be excluded, which is highly desirable for this process as the entrapment of air in the felt layers 28, 36 and 42 creates undesirable problems.

Although tubes which are impregnated with uncured synthetic resin are described, it is to be mentioned that these tubes could be constructed essentially of pre-preg materials.

I claim:

1. A method of lining a pipeline or passageway which includes:
    (1) providing a tube lining assembly comprising:
        (a) a first tube section having a leading end and a trailing end and comprising an outer fluid impervious membrane and an interior wall of absorbent material impregnated with a curable synthetic resin,
        (b) a second tube section having a leading end and a trailing end and comprising an outer fluid impervious membrane and an interior wall of absorbent material impregnated with a curable synthetic resin, and
        (c) a third tube section having a leading end and a trailing end and comprising a pre-liner tube section, and wherein the leading end of the first tube is sealed and is connected to the trailing end of the third tube section, the trailing end of the first tube section is connected to the leading end of the second tube section and the trailing end of the second tube section is sealed, the connection between the trailing end of the first tube section and the leading end of the second tube section forming a seal between the sections so that with the sealing of the leading end of the first tube section and the trailing end of the second tube section the resin retained in the first and second tube sections is sealed from the atmosphere and wherein the length of said first, second and third tube sections is not less than the length of the pipeline or passageway to be lined, and
    (2) fixing the leading end of said third tube section at a location adjacent the inlet of said pipeline or passageway, and everting said preliner tube section within said pipeline or passageway, to pull the first tube section along the length of the pipeline or passageway, said first tube section being in a collapsed condition while being pulled into and along the length of the pipeline or passageway, during which time the trailing end of said first tube section is connected to the leading end of said second tube section,
    (3) everting said second tube section into the interior of said collapsed first tube section after said first tube section has been completely pulled into said pipeline or passageway so that said collapsed first tube section will be progressively expanded outwardly toward the interior walls of said pipeline or passageway, whereby the interior walls of said first and second tube sections will be in face-to-face contact at the completion of eversion,
    (4) carrying out steps (2) and (3) while maintaining the first and second tube sections sealed from the atmosphere, and
    (5) curing said curable synthetic resin.

2. A method according to claim 1 wherein the third tube section is everted into the pipeline or passageway by water and wherein said first tube section is floated into the pipeline or passageway by being buoyantly supported on or in the water.

3. A method according to claim 1 wherein said first tube section and said second tube section are sealingly interconnected by a connection tube.

4. A method according to claim 3 wherein said connection tube is provided with a fold and is folded upon itself to facilitate the eversion process of step (3).

5. A method for lining a passageway which comprises
    (a) providing an assembly comprising a prelining tube, a lining tube and an inflation tube, each of said tubes having leading and trailing ends, the trailing end of the pre-lining tube being connected to the leading end of the lining tube and the trailing end of the lining tube being connected to the leading end of the inflation tube,
    (b) everting into the passageway the prelining tube that is impermeable to fluids so that during the course of eversion the lining tube is pulled along the length of the passageway, said lining tube having walls comprising absorbent material impregnated with a curable synthetic material and being sealed to such an extent to prevent contact between the atmosphere and the resin and being in a collapsed condition,
    (c) everting said inflation tube into the interior of said collapsed lining tube after said lining tube has been positioned in the passageway so that the lining tube will thereby be progressively expanded outward toward the interior walls of said passageway while maintaining said resin sealed from the atmosphere, and (d) curing said curable synthetic resin.

6. A method according to claim 5 wherein the leading end of the lining tube and the trailing end of the prelining tube are sealed off from each other.

7. A method according to claim 5 wherein said inflation tube and lining tube are interconnected by an inversion tube.

8. A method according to claim 5 wherein said inversion tube is provided with a top or fold and is folded upon itself to facilitate the eversion process of step (c).

9. A method for lining a length of passageway which comprises the steps of
 (a) providing an assembly comprising a pre-lining tube of a length at least equal to the length of passageway to be lined, and a lining tube of a length at least equal to the length of the passageway to be lined, each of said tubes having leading and trailing ends, the trailing end of the pre-lining tube being connected to the leading end of the lining tube so that the assembly is at least twice the length of the length of the passageway to be lined,
 (b) fixing the leading end of the pre-lining tube in position in relation to one end of the passageway,
 (c) everting the pre-lining tube that is impermeable to fluids through the fixed leading end thereof into the passageway to cause the lining tube to be pulled after the pre-lining tube through said fixed end and along the length of the passageway, said lining tube having walls comprising absorbent material impregnated with a curable synthetic resin and being sealed at its ends preventing the atmosphere from contacting said resin and being in a collapsed condition,
 (d) expanding said collapsed lining tube outward onto the pre-lining tube on the interior walls of said passageway while maintaining the sealed condition of the lining tube, and
 (e) curing said curable synthetic resin.

10. A method of lining a passageway having a near end and a distal end with a collapsed lining tube assembly which comprises an impervious lining tube and an impervious inflation tube, each of said tubes having leading and trailing ends, the trailing end of the lining tube being sealingly connected to the leading end of the inflation tube, the leading end of the lining tube being sealed, the trailing end of the inflation tube being sealed, one of said lining tube and inflation tube having walls comprising absorbent material impregnated with a curable synthetic resin, and the lining tube and inflation tube being internally devoid of air so that the lining tube assembly assumes a collapsed condition, and comprising the steps of:
 (a) feeding the entire lining assembly so that the leading end of the lining tube moves along the length of the passageway to the distal end thereof, and the sealed connection between the lining tube and inflation tube is at the near end thereof,
 (b) engaging the sealed connection and anchoring same at the near end of the passageway while maintaining the seal of said connection to prevent any air from entering the interior of the lining assembly, everting the inflation tube into the lining tube using fluid pressure to deliver the trailing end of the inflation tube to the distal end of the passageway, and
 (c) curing said curable synthetic resin.

* * * * *